Patented Dec. 5, 1950

2,532,612

UNITED STATES PATENT OFFICE 2,532,612

PREPARATION OF UNSATURATED THIO-ETHERS

Thomas F. Doumani, Los Angeles, Calif., assignor to Union Oil Company of California, Los Angeles, Calif., a corporation of California No Drawing. Application August 29, 1945, Serial No. 613,417

11 Claims. (Cl. 260—609)

This invention relates to the dehydration of dihydric sulfur alcohols to obtain unsaturated thioethers such as divinyl thioether and its homologs. These products have been found useful as solvents, chemicals, or raw materials for production of resins, rubbers and plastics. This is a continuation-in-part of my copending application Serial No. 446,058, filed June 6, 1942, and now issued as U. S. Patent No. 2,402,878.

The dihydric sulfur alcohols, or as they may also be called, hydroxyalkyl sulfides or hydroxyalkyl thioethers, which are dehydrated by the process of this invention, have the general formula $R_1$—S—$R_2$ in which $R_1$ and $R_2$ are hydroxy-substituted alkyl or cycloalkyl groups each having at least two carbon atoms, and preferably less than about 10 carbon atoms, although dihydric sulfur alcohols having more than 10 carbon atoms in each group may also be dehydrated by this process. The products of complete dehydration have the general formula $R_3$—S—$R_4$ in which $R_3$ and $R_4$ are hydrocarbon groups having one more degree of unsaturation each than do $R_1$ and $R_2$. The process is particularly applicable to those sulfur alcohols in which $R_1$ and $R_2$ are saturated groups, but may also be employed for the dehydration of those sulfur alcohols in which $R_1$ and $R_2$ are unsaturated, especially if they have no more than one degree of unsaturation each. In the latter case, the products of dehydration will have at least two degrees of unsaturation each. In determining the degrees of unsaturation, each olefinic double bond in the molecule is considered as one degree of unsaturation and each triple bond is considered as two degrees of unsaturation. $R_1$ and $R_2$ may also be interconnected to form a ring. The sulfur alcohols which are dehydrated by the process of this invention, and the products of the dehydration will become clear by reference to the following examples of dehydration reactions included in the scope of this invention.

Equation 1

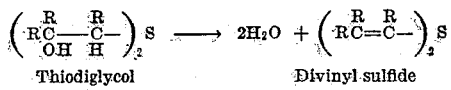

Thiodiglycol → Divinyl sulfide

Equation 2

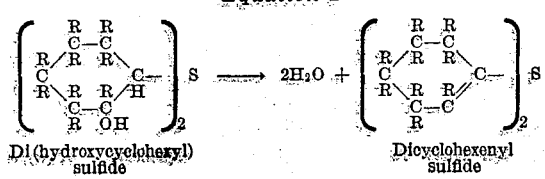

Di(hydroxycyclohexyl) sulfide → Dicyclohexenyl sulfide

Equation 3

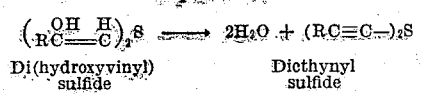

Di(hydroxyvinyl) sulfide → Diethynyl sulfide

Equation 4

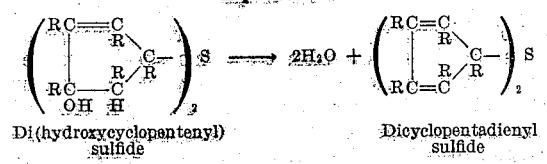

Di(hydroxycyclopentenyl) sulfide → Dicyclopentadienyl sulfide

Equation 5

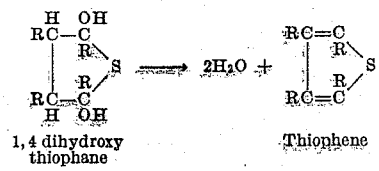

1,4 dihydroxy thiophane → Thiophene

The names shown under the above formulas are the names of those compounds in which the R's represent hydrogen atoms. Also within the scope of this invention, however, are similar dehydration reactions for the related compounds in which the R's represent hydrocarbon groups such as alkyl, cycloalkyl or aryl groups such as methyl, butyl, cyclohexyl, methyl cyclopentyl, phenyl, tolyl, benzyl, etc., or the hydroxy substituent groups are attached to other carbon atoms. It is obvious that for the dehydration to occur, the carbon atom adjacent to the one having the hydroxy substituent must have a hydrogen attached to it, so that the elimination of water from the molecules will form a double bond between these carbon atoms.

An inspection of the above equations will show that Equation 1 represents the dehydration of a sulfur alcohol of formula $R_1$—S—$R_2$ in which $R_1$ and $R_2$ are hydroxy-substituted saturated alkyl groups; Equation 2 shows the dehydration of a sulfur alcohol in which $R_1$ and $R_2$ are hydroxy-substituted saturated cycloalkyl groups; in Equation 3, $R_1$ and $R_2$ are hydroxy-substituted unsaturated alkyl groups; in Equation 4, $R_1$ and $R_2$ are hydroxy-substituted unsaturated cycloalkyl groups; and in Equation 5, $R_1$ and $R_2$ are interconnected to form a ring.

It is clear that the above equations merely represent specific examples of the dehydration of sulfur alcohols of different types and the invention is not limited to these specific examples. Thus in Equation 1, in place of the sulfur alcohol having the 2-hydroxyethyl groups shown, sulfur alcohols having other saturated hydroxy alkyl groups may be employed. Examples of such saturated hydroxyalkyl groups are 2-hydroxy propyl, 3-hydroxypropyl, 2-hydroxy n-butyl, 3-hydroxy isobutyl, 4-hydroxy n-butyl, 2-hydroxy n-amyl, 2-hydroxy iso-amyl, 4-hydroxy iso-amyl, 2-hydroxy hexyl, and like groups in which the R's represent hydrogen or hydrocarbon (alkyl, cycloalkyl or aryl) groups as described above.

Also in place of the sulfur alcohol having the 2-hydroxy cyclohexyl groups in Equation 2, sulfur alcohols having other saturated hydroxycycloalkyl groups may be employed, such as sulfur alcohols having cyclohexyl groups having the hydroxy substituent in the 3 or 4 position, cyclopentyl groups having the hydroxy substituent in the 2 or 3 position, and hydroxy substituted cyclohexyl or cyclopentyl groups in which one or more hydrogens are replaced by hydrocarbon groups as described above.

Similarly in Equations 3 and 4, in place of the sulfur alcohols having the specific unsaturated groups shown sulfur alcohols having unsaturated groups corresponding to the saturated groups described above for Equations 1 and 2 may be employed. Also in Equation 5 sulfur alcohols having the hydroxy substituent groups at other positions, or those in which the R's represent alkyl, cycloalkyl or aryl groups, or sulfur alcohols having six-membered rings instead of the five-membered rings shown may be dehydrated also. Obviously, in any of the above sulfur alcohols of this invention, the $R_1$ and $R_2$ of the general formula $R_1$—S—$R_2$ may be the same or different groups.

The above sulfur alcohols which are dehydrated according to a process of this invention may be prepared in a number of ways. Two convenient ways of preparing thiodiglycol, for example, are shown as follows:

*Equation 6*

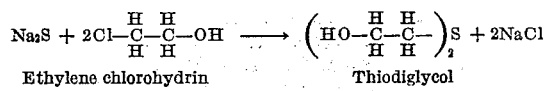

Ethylene chlorohydrin      Thiodiglycol

*Equation 7*

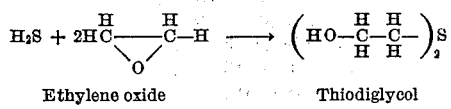

Ethylene oxide      Thiodiglycol

Sulfur alcohols in which $R_1$ and $R_2$ of the general formula $R_1$—S—$R_2$ are different, may be prepared in either of the two ways as follows:

*Equation 8*

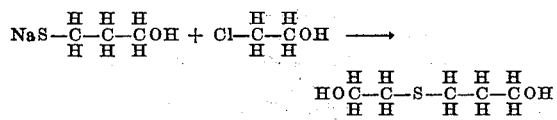

*Equation 9*

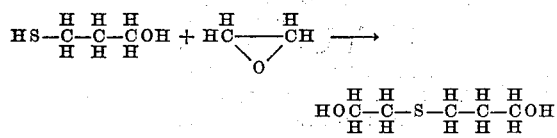

Similar methods may be employed for preparing the other sulfur alcohols which are dehydrated by the process of this invention.

Briefly, therefore, it is the object of this invention to provide methods of dehydrating the above sulfur alcohols whereby monomeric or polymeric thioethers of a greater degree of unsaturation than the sulfur alcohols may be obtained, the polymeric products being simple polymers of the monomers shown. The dehydration may be complete as illustrated in the above equations, or may be partial, i. e. either $R_1$ or $R_2$ may be dehydrated without dehydrating the other group. The products of partial dehydration of the starting materials of Equations 1 to 5 respectively, for example, are as follows:

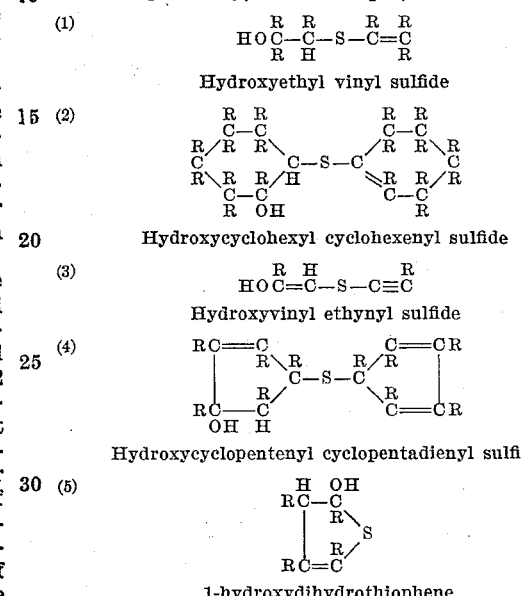

The invention resides in four types of catalytic dehydration, namely (1) processes involving inorganic acid catalysts, (2) processes involving inorganic salt catalysts (3) processes involving alkali metal hydroxide catalysts, and (4) vapor phase catalytic dehydration processes employing inorganic oxide catalysts. The preferred process is that involving the solid alkali hydroxides as catalysts.

The action of the alkali hydroxides as catalysts is unique in that rapid dehydration with essentially no polymerization of the monomeric olefin products may be obtained. These catalysts are particularly well suited to continuous dehydration processes, since they are not appreciably contaminated by side reaction products. They act as true catalysts in that they do not enter into the reaction, and may be used for a very long time without replacement. These catalysts are also particularly desirable in the reactions involving dehydration of relatively unstable materials which may be destroyed by heat or strong acid catalysts.

In employing these alkali hydroxides in the process of this invention the sulfur alcohols are merely contacted with the solid alkali metal hydroxide at a temperature above 150° C., up to about 300° C., and preferably about 200° C., and the products of the reaction, i. e. the water, and preferably also the unsaturated thioether, are withdrawn as formed. In the preferred liquid phase process, these products are removed by distillation, and the pressure may be adjusted so as to distill these products without distilling the sulfur alcohol. Reflux may be provided to minimize the distillation of the unreacted sulfur alcohol, or some sulfur alcohol distillation may be allowed to take place, and the product redistilled to separate the unreacted sulfur alcohol which may be returned to the system. Where traces of high boiling products of side reactions are formed and accumulate over a long period of time, these usually form a separate phase insoluble in the sulfur alcohol in the presence of the catalyst, and this separate phase may be drawn off periodically. Potassium hydroxide is the preferred catalyst. However, sodium hydroxide is also suitable, and the hydroxides of the other alkali metals, namely lithium, rubidium and caesium may also be employed.

As specific examples of the process of this invention the following experiments were carried out:

*Example 1*

2,2' dihydroxyethyl sulfide was prepared by reacting hydrogen sulfide with ethylene oxide as indicated in the above Equation 7. Ten ml. of this product plus 10 g. of solid potassium hydroxide pellets were heated at 190° to 220° C. for about 20 minutes. Water formed in the reaction boiled off during this period and on cooling, the remaining liquid was found to be stratified into two layers. The upper oily layer was removed by decantation, and was distilled to separate two products, namely the product of complete dehydration, divinyl sulfide, and the product of partial dehydration, vinyl hydroxyethyl sulfide. Small amounts of polymeric divinyl sulfide were also found to be present.

In a second experiment employing a continuous process, 10 g. of solid KOH was heated to about 200° C., and 2,2'-dihydroxyethyl sulfide was added continuously while the resulting divinyl sulfide was allowed to distill with the water, as formed, through a fractionating column. Substantially complete dehydration of the original sulfur alcohol was accomplished.

In similar experiments 2,2'-dihydroxypropyl sulfide (prepared by reacting propylene oxide with hydrogen sulfide) was dehydrated with formation of diallyl sulfide and hydroxypropyl sulfide, the latter having the formula $$\begin{array}{ccccccc} H & H & H & & H & H & H \\ HC{=}C{-}C & {-}S{-} & C{-}C{-}CH \\ & & H & & H & OH & H \end{array}$$

3,3'-dihydroxypropyl sulfide was similarly dehydrated to obtain diallyl sulfide, employing solid sodium hydroxide pellets in this case and employing a temperature between about 200° and 230° C. Similarly, the sulfur alcohol prepared by reacting styrene oxide with hydrogen sulfide, namely

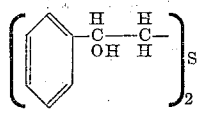

was dehydrated to form distyryl sulfide

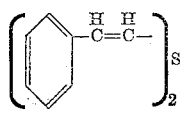

employing solid potassium hydroxide as the catalyst at a temperature of about 220° C.

*Example 2*

Di(hydroxycyclohexyl) sulfide was prepared by reacting sodium sulfide with chlorocyclohexanol and this sulfur alcohol was dehydrated as in the above Equation 2, by contacting it with solid potassium hydroxide at a temperature of about 180° C. and distilling off the water as formed. A substantial yield of dicyclohexenyl sulfide as well as the product of partial dehydration as shown above was obtained in two hours of operation. In a second experiment, in which the product of complete dehydration, dicyclohexenyl sulfide, was distilled off as formed, a substantially complete conversion to this product was obtained.

In a similar experiment di(hydroxymethylcyclopentyl) sulfide

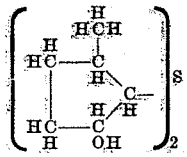

was dehydrated in the presence of solid sodium hydroxide at about 200° C. to obtain an approximately 50% yield of the product of complete dehydration

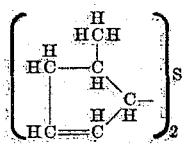

in a period of about an hour.

*Example 3*

Butadiene monoxide was reacted with hydrogen sulfide to obtain the sulfur alcohol having the following structure:

This sulfur alcohol was contacted with solid potassium hydroxide at a temperature of about 250° C., distilling off water and the product of complete dehydration as formed. In a period of about two hours a yield corresponding to about 50% dehydration was obtained, the principal product having the following structure:

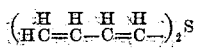

Polymers of this product were also present. Upon continuation of the heating further yields of this product were obtained.

The dehydration shown in Equation 3, in which diethynyl sulfide was obtained was also carried out under approximately the same conditions.

*Example 4*

The dehydration of di(hydroxycyclopentenyl) sulfide as illustrated by Equation 4 above was carried out in the presence of potassium hydroxide at a temperature of about 200° C., boiling off the water and dicyclopentadienyl sulfide as formed. A substantial yield was obtained within an hour. Di(hydroxycyclohexenyl) sulfide was similarly dehydrated, employing solid sodium hydroxide at a temperature of about 225° C.

*Example 5*

The dehydration of 1,4-dihydroxythiophane to obtain thiophene as shown in Equation 5 above was carried out as in the above experiments, employing solid potassium hydroxide at a temperature of about 170° C. A substantial yield of thiophene was obtained in the space of two hours. In a similar experiment di(hydroxydimethyl) thiophane was dehydrated to obtain dimethyl thiophene.

As indicated by the above examples, temperatures in excess of about 150° C. are required. The reaction proceeds most readily with potassium hydroxide, but other alkali metal hydroxides in solid form may also be employed. These may be supported on inert carriers if desired. The reaction is preferably carried out in the liquid phase as in the above examples, employing a sufficient pressure to maintain a substantially liquid phase in contact with the catalyst, but the reaction may also be carried out by reducing the pressure sufficiently to maintain the sulfur alcohol in the vapor phase, and contacting these vapors with the solid alkali metal hydroxide. In the vapor phase reaction temperatures somewhat higher than the temperatures employed in the liquid phase reaction, up to about 450° C. are more desirable.

Although it has been found that heat alone will effect substantial dehydration of sulfur alcohols, which fact is in marked contrast to the behavior of ordinary alcohols, the use of catalysts is preferred. Furthermore, heat and catalysts will polymerize the olefinic products of the dehydration. This permits the combination of dehydration and concurrent polymerization, and even the combination of the three processes, of sulfur alcohol formation, dehydration, and polymerization. In general, temperatures above 150° C. are required for any or all of these reactions (except the alcohol formation itself, which may be carried out at lower temperatures in most instances) and continuous removal of the product water by fractionation is desirable. Suppression of polymerization and acceleration of dehydration is promoted by use of as low a temperature as possible and adjustment of pressure to permit continuous removal, by fractional distillation, of the monomeric product as well as the water. When concurrent polymerization is desired, modifiers such as styrene for example, may be added during the course of the dehydration or polymerization, if co-polymerization or modification of the resinous polymer is desired.

Examples of inorganic acids which are particularly suitable catalysts for the purposes of this invention are sulfuric and phosphoric acids, which should have concentrations above about 90%. These may be used at temperatures of about 150° C. or above, such as about 130° C. to about 200° C. These catalysts are particularly useful when concurrent polymerization is desired.

As an example of the use of inorganic acid catalysts, 10 ml. of thiodiglycol and 1 ml. of concentrated H2SO4 were heated to about 150° C. for about one-half hour, boiling off water. The product was predominantly the dimer and higher polymers of divinyl sulfide, though some monomer was also present.

Inorganic salt catalysts which may be used include anhydrous or partly hydrated zinc chloride (over about 80% concentration), and anhydrous or partly hydrated ferric chloride or tin chloride. In general, these induce dehydration at slightly lower temperatures than those required for the alkali metal hydroxide catalysts. They are more similar in this respect to the inorganic acid catalysts, and also promote substantial polymerization of olefinic products. Again continuous removal of the monomer represses polymerization. As an example, 10 ml. of thiodiglycol was heated with 10 g. of anhydrous zinc chloride to a temperature of about 200° C. for about one-half hour, allowing water and monomeric divinyl sulfide to distill off. Considerable polymeric product was found in the residue.

Vapor phase dehydration, using inorganic oxide catalysts such as activated alumina, bauxite, clay, fuller's earth, and silica gel, is effective especially at temperatures above 200° C., and is accompanied by considerable polymerization. The degree of polymerization may be controlled to a considerable extent by regulation of the temperature and pressure and by use of inert gases as diluents or carriers, in general low temperatures, low pressures and diluents having the effects of depressing polymerization.

As an example of this process, 50 ml. of granular activated alumina was placed in a tube heated to 325° C. and thiodiglycol vapors were passed over the catalyst, using a feed rate of 50 ml. per hour. The product, when condensed, was found to be largely divinyl sulfide and its polymers.

Similar results were obtained with sulfur alcohols of this invention other than thiodiglycol, using the acid, salt, and oxide catalysts as described above.

Although the above description of the invention has been confined to the dehydration of dihydric sulfur alcohols, it has been found that substantially the same procedure may be employed for the dehydration of monohydric sulfur alcohols. The dehydration reactions for the monohydric sulfur alcohols corresponding to the dehydration reactions for the dehydric sulfur alcohols shown in Equations 1 to 5 above are indicated in Equations 1A to 5A as follows:

*Equation 1A*

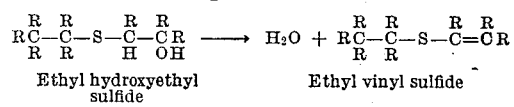

Ethyl hydroxyethyl sulfide     Ethyl vinyl sulfide

*Equation 2A*

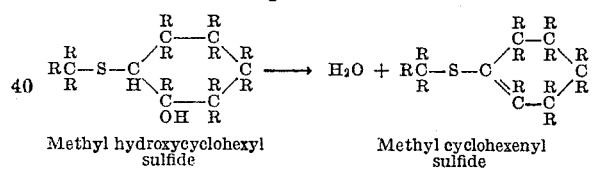

Methyl hydroxycyclohexyl sulfide     Methyl cyclohexenyl sulfide

*Equation 3A*

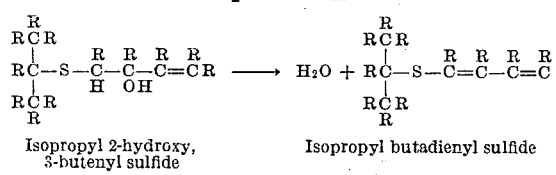

Isopropyl 2-hydroxy, 3-butenyl sulfide     Isopropyl butadienyl sulfide

*Equation 4A*

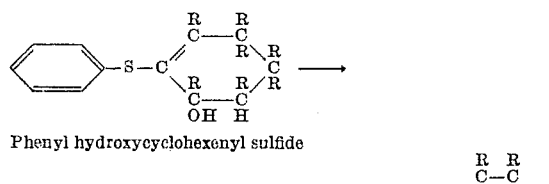

Phenyl hydroxycyclohexenyl sulfide

Phenyl cyclohexadienyl sulfide

*Equation 5A*

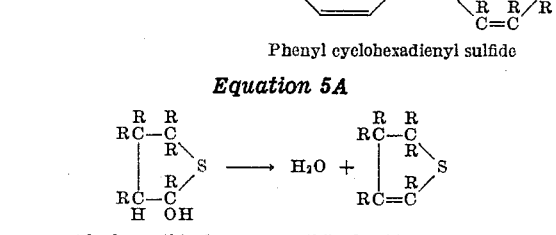

1-hydroxy thiophane     Dihydrothiophene

As examples of these dehydrations, 10 ml. of ethyl-hydroxyethyl sulfide (prepared by reacting ethyl mercaptan with ethylene oxide) and 10 g.

of solid potassium hydroxide pellets were heated at 190° C. to 220° C. for twenty minutes. Water formed in the reaction boiled off during this period, and the remaining liquid stratified into two layers. The upper oily layer was removed by decantation, and was distilled to obtain a yield of about 80% of exclusively monomeric ethyl vinyl sulfide boiling at 91.3° C. (uncorrected). The 20% residue was unchanged alcohol which was returned to the original vessel with the KOH layer, and re-heated to the original temperature of about 200° C. for another 20 minutes, at which time it was found that as nearly as could be observed, all of the original alcohol had been converted to monomeric ethyl vinyl sulfide.

In another mode of carrying out this reaction an arrangement of apparatus was made whereby 10 g. of solid KOH was heated to about 200° C., while ethyl hydroxyethyl sulfide was added at a rate of about 1 ml./min., and water and monomeric ethyl vinyl sulfide were removed continuously through a fractionating column. After about an hour an equilibrium was established at which the rate of production was approximately equal to the rate of feed. No appreciable deterioration of the catalyst was observed in several hours of operation.

In similar experiments butyl hydroxyethyl sulfide was dehydrated at a temperature of about 225° C.; the sulfur alcohol

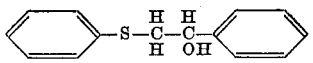

prepared by reacting thiophenol with styrene oxide, was dehydrated at a temperature of about 250° C. in the presence of solid sodium hydroxide to obtain substantial yields of phenyl styryl sulfide

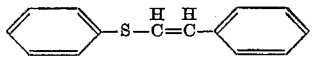

the sulfur alcohol

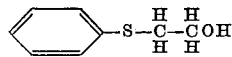

prepared by reacting thiophenol with ethylene oxide, was also dehydrated under the above conditions to obtain phenyl vinyl sulfide; and the dehydrations indicated in Equations 2A to 5A were carried out with the specific materials named as well as with homologs thereof. In all of these dehydrations the conditions described above for the dehydration of the dihydric sulfur alcohols were found to be suitable also for the dehydration of the monohydric sulfur alcohols.

It is within the scope of this invention therefore to prepare an unsaturated thioether by contacting the corresponding hydroxy-substituted thioether (including both the monohydric and dihydric sulfur alcohols described above) with a catalyst maintained at a temperature above about 150° C., the preferred catalysts being the solid alkali metal hydroxides, using a reaction time sufficient to split out water from the molecule and thereby form the desired unsaturated thioether, and removing the water and preferably also the unsaturated thioethers, as formed.

Modifications of this invention which would occur to one skilled in the art are to be included in the scope of the invention as defined in the following claims.

I claim:

1. A process for the preparation of an unsaturated thioether which comprises contacting a dihydroxy-substituted thioether having the formula $R_1$—S—$R_2$ in which $R_1$ and $R_2$ are hydroxy-substituted hydrocarbon groups having at least two carbon atoms with a solid alkali metal hydroxide maintained at a temperature above 150° C., for a time sufficient to split out at least one molecule of water from the molecule and form an unsaturated thioether, and continuously removing said water as formed.

2. A process according to claim 1 in which the alkali metal hydroxide is potassium hydroxide.

3. A process according to claim 1 in which the alkali metal hydroxide is sodium hydroxide.

4. A process for the preparation of an unsaturated thioether which comprises contacting a saturated dihydroxy-substituted thioether having the formula $R_1$—S—$R_2$ in which $R_1$ and $R_2$ are hydroxy-substituted saturated hydrocarbon groups having at least two carbon atoms with a solid alkali metal hydroxide maintained at a temperature above 150° C. for a time sufficient to split out at least one molecule of water from the molecule and from said unsaturated thioether, and continuously removing said water as formed.

5. A process according to claim 4 in which the saturated dihydroxy-substituted thioether is a di(hydroxyalkyl) thioether.

6. A process according to claim 4 in which the saturated dihydroxy-substituted thioether is a di(hydroxycycloalkyl) thioether.

7. A process for the preparation of an unsaturated thioether which comprises subjecting a saturated dihydroxy-substituted thioether having the formula $R_1$—S—$R_2$ in which $R_1$ and $R_2$ are hydroxy-substituted saturated hydrocarbon groups having at least two carbon atoms to a temperature above 150° C. in the presence of an inorganic dehydration catalyst for a time sufficient to split out at least one molecule of water from the molecule and form said unsaturated thioether, and continuously removing said water and unsaturated thioether as formed.

8. A process for the preparation of an unsaturated thioether which comprises contacting a saturated dihydroxy-substituted thioether having the formula $R_1$—S—$R_2$ in which $R_1$ and $R_2$ are hydroxy-substituted saturated hydrocarbon groups having at least two carbon atoms with a solid alkali metal hydroxide maintained at a temperature above 150° C. for a time sufficient to split out at least one molecule of water from the molecule and from said unsaturated thioether, and continuously removing said water and unsaturated thioether as formed.

9. A process according to claim 8 in which the alkali metal hydroxide is potassium hydroxide.

10. A process for the preparation of a vinyl alkenyl thioether which comprises contacting a hydroxyethyl, hydroxyalkyl thioether with a solid alkali metal hydroxide maintained at a temperature above 150° C. for a time sufficient to split out water from the molecule and form said vinyl alkenyl thioether, and continuously removing said water and vinyl alkenyl thioether as formed.

11. A process for the preparation of divinyl sulfide which comprises contacting 2,2'-dihydroxyethyl sulfide in the liquid phase with solid potassium hydroxide at a temperature above about 150° C. for a time sufficient to split out water from the molecule and form divinyl sulfide, while continuously distilling off said water and divinyl sulfide as formed.

THOMAS F. DOUMANI.

(References on following page)

REFERENCES CITED

The following references are of record in the file of this patent:

UNITED STATES PATENTS

| Number | Name | Date |
|---|---|---|
| 2,221,418 | Weihe | Nov. 12, 1940 |
| 2,378,576 | Okita | June 19, 1945 |

FOREIGN PATENTS

| Number | Country | Date |
|---|---|---|
| 485,554 | Great Britain | May 16, 1938 |

OTHER REFERENCES

Clayton et al.: "Jour. Am. Chem. Soc.," vol. 64, pages 908–909 (April 1942).

Fromm: "Berichte Deut. Chem. Gesell.," vol. 56, pages 2286–2289 (1923).

Bales et al.: J. C. S. (London), vol. 123, page 2486 (1923).

Sabatay: Bull. Soc. Chim. (Ser. 4), vol. 45, pages 69 to 75 (1929).